United States Patent [19]

Baumann et al.

[11] 4,095,776

[45] Jun. 20, 1978

[54] SUCTION CONVEYING AND MIXING APPARATUS

[75] Inventors: Rudi Baumann, Rosenberg; Otmar Link, Gotzingen; Gerhard Nied, Rosenberg, all of Germany

[73] Assignee: AZO-Maschinenfabrik Adolf Zimmermann, Germany

[21] Appl. No.: 725,343

[22] Filed: Sep. 21, 1976

[30] Foreign Application Priority Data

Oct. 7, 1975 Germany .............................. 2544716

[51] Int. Cl.² ............................................. B01F 15/00
[52] U.S. Cl. ....................................... 366/163; 302/26
[58] Field of Search ............... 302/1, 17, 27, 28–30, 302/34, 36, 39, 42, 45–48; 259/2, 4 R, 4 AC

[56] References Cited

U.S. PATENT DOCUMENTS

| 3,851,924 | 12/1974 | Roberson et al. | 302/28 |
| 3,871,626 | 3/1975 | Wohlfarth | 259/36 |
| 3,871,711 | 3/1975 | Rusterholz | 302/26 |
| 3,881,702 | 5/1975 | McIver | 259/4 R |
| 3,913,891 | 10/1975 | Steele | 259/4 R |
| 3,951,461 | 4/1976 | De Feudis | 302/27 |

*Primary Examiner*—Leonard D. Christian
*Attorney, Agent, or Firm*—Craig S. Antonelli

[57] ABSTRACT

In a suction conveying installation in which different bulk materials are conveyed from respective supply containers to a separator which may serve as a weighing container, the separator is adapted to serve as a mixer and comprises at the bottom at least one ventilation valve to be opened after the end of the separating or weighing operation while the suction fan of the installation is still running, so that air is drawn into the container from the bottom to entrain and mix the materials. Constructional details of the separator including various valve arrangements are described, also certain control arrangements including a pressure monitoring device downstream of the separator.

14 Claims, 3 Drawing Figures

SUCTION CONVEYING AND MIXING APPARATUS

The invention relates to a suction conveying installation having two or more supply containers for different bulk material components, one or more suction conduits which are connected to the supply containers, a separator which may be constructed as a weighing container and has a bottom aperture for emptying the bulk material, a suction fan downstream of the separator, and a mixer for the two or more bulk material components which are separated out from the conveying stream. Such suction conveying installations are often used as well as pressure conveying installations in process engineering, in order to bring various substances which are present in the form of bulk material from the supply containers into the vicinity of the processing station. Two or more supply containers, for example silos or storage bins, feed towards a single separator. If the latter is constructed as a weigher, the components which are separated one after the other are weighed directly after their separation and are either collected in the weigher or discharged individually in each case from the weigher.

In many cases the bulk material components which are discharged from the separator or from the weigher — for example, differently coloured or different types of plastics material granulate, materials ground to different grades or the like — have to be mixed before they are processed. For this purpose, as well as mechanical mixers, pneumatic mixers are also used which consist of a container with one or more compressed air connections. Often insert elements are provided in the container in order to make the air flow and the material move in certain desired ways (German Pat. No. 2 121 636; German Pat. No. 2 108 418). In all cases the bulk material components must be emptied from the separator or weigher and fed into the separate compressed air mixer.

An object of the present invention is to construct a suction conveying installation, of the type described in the introductor paragraph above, in such a manner that the bulk material components can be discharged from the separator in the mixed state.

This object is achieved according to the present invention in that the separator, which may be at the same time a weighing container, is adapted to serve as a mixer and comprises, in the region of its bottom aperture, at least one ventilation or aeration valve which is opened after the end of the separating or weighing operation while the suction fan is running.

The separator container, subjected to negative pressure with the fan running, has air supplied into it from below by the opening of the ventilation valve. As a result the particles of the column of material situated in the inflow cross-section are lifted and circulated whilst the material in neighbouring regions slides downwards to take the place of the lifted particles until it is finally also taken up by the inflowing air and conveyed upwards. At the same time, because of the different outflow speed for the material over the cross-section of the container, a mixing in the vertical direction also takes place.

The invention achieves the important step forward in technical progress that a separate pneumatic mixer including a fan and valves can be dispensed with, the hitherto necessary transfer of the material from the separator into the mixer is no longer necessary, and the mixed material can be taken directly from the suction conveying installation, namely the separator or weigher. The mixing time depends substantially only on the volume of the contents and is not longer than in conventional compresssed air mixers. However, it may be advisable to make the suction fan somewhat more powerful than would be necessary for the purpose of conveying alone. The filter which is arranged in the separator in suction conveying installations and which separates the separating chamber from the purified gas side is used in ventilation or mixing for the purpose of separating the upwardly conveyed material, so that this cannot get into the suction union.

The ventilation valve can be so constructed or arranged that the air flows axially, eccentrically or obliquely into the container. The ventilation valve can also be so controlled that the air flows in continuously or intermittently. With continuous inflow of air it is advisable to give the separator container a non-continuously conical wall and, if necessary, to provide the wall with detaching edges for the outward flow of material, which edges can be formed for example by simply inserting sections of the container into one another. In a preferred, very simple, constructional form the ventilation valve is formed by the bottom aperture and its closure element, which is provided in a known manner with an adjusting drive for opening and closing. Thus the suction conveying installation need not be modified at all or only to a slight extent in order to obtain a mixed end product at the same time.

Further details of the invention are characterized in the subsidiary claims.

The invention will now be described in detail, by way of example, with reference to the accompanying diagrammatic drawings, in which.

Figure 1:
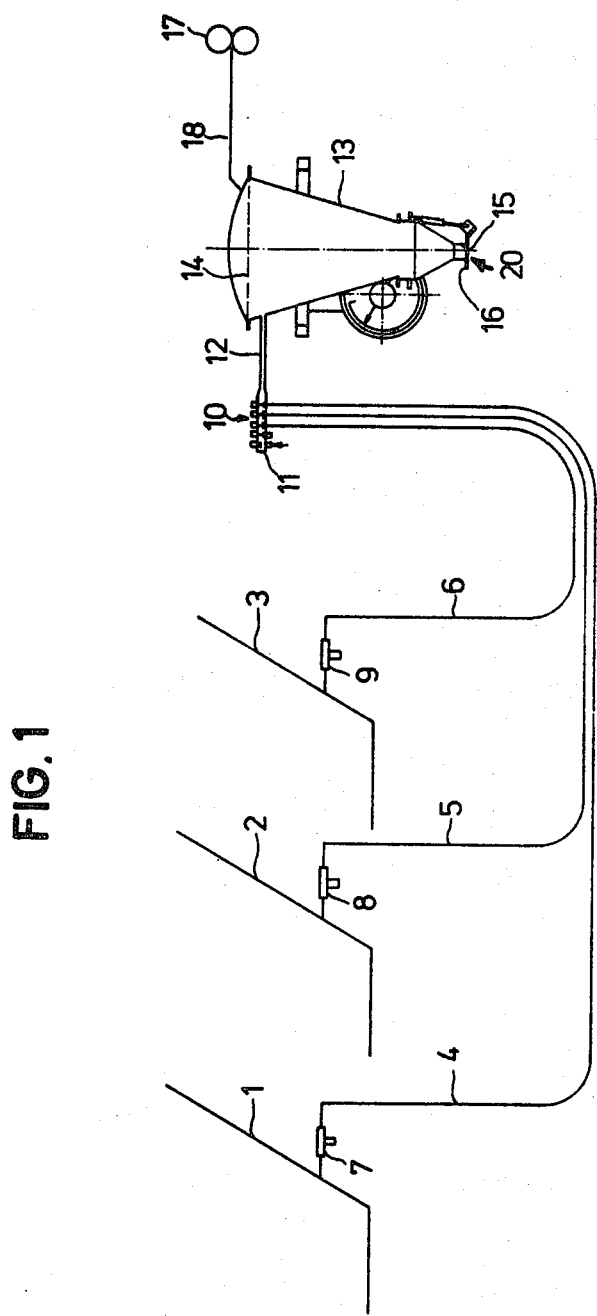
FIG. 1 is a schematic view which shows a flow chart of a suction conveying installation.

The suction conveying installation shown in FIG. 1 comprises three storage bins 1, 2 and 3 in which bulk materials of different physical or chemical properties are stored. Connected to each storage bin 1, 2 and 3 in the contructional example shown is a respective suction conduit 4, 5 and 6, and each of these conduits is vented by means of a snifting valve 7, 8 and 9. The suction conduits 4, 5 and 6 may of course be only short conduit sections which open into a common collecting conduit. The suction conduits 4, 5 and 6 lead to a common valve block 10 with shutoff valves for each conduit. The valve block also comprises a ventilation valve 11 and is connected by way of a short conduit section 12 to a separator 13 which in its head part comprises a filter 14 and at its bottom portion a discharge aperture 15 which is closed by a flap 16. A conduit 18 leading to a suction fan 17 is connected to the head part.

In the constructional example shown, the separator 13 is constructed as a weigher, and in all the drawings the bearing arrangement and the indicating mechanism are only sketchily indicated. The components conveyed separately from the storage bins 1, 2 or 3 by way of the suction conduits 4, 5 or 6 into the separator 13 are weighed therein and lie in beds one above the other after a conveying cycle has been completed.

The components are, however, required in a homogeneous mixture at the processing station, which may be situated in the immediate vicinity of the separator 13. Therefore, the separator 13 is constructed at the same time as a mixer. For this purpose a ventilation valve 20 is situated near the bottom aperture 15 which, in the constructional example illustrated, is closed by a flap 16.

Figure 2:
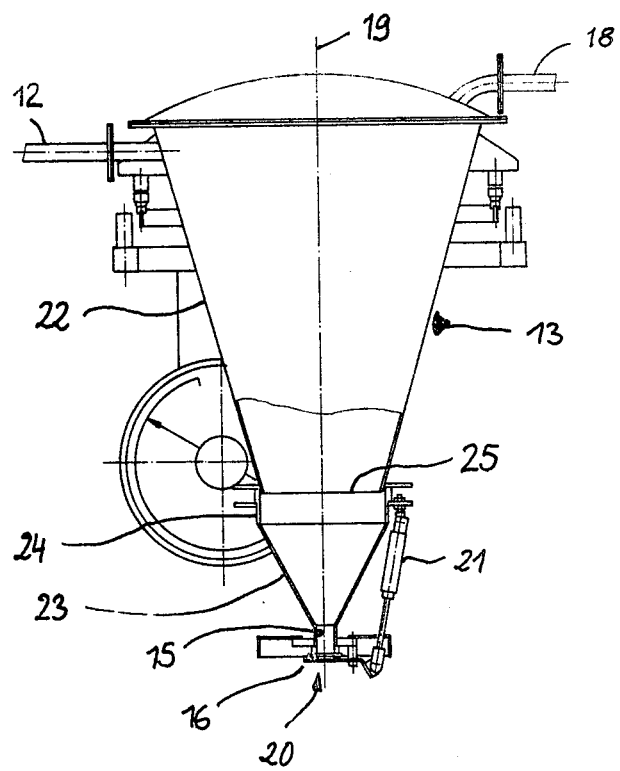
FIG. 2 is a detail view which shows, on a larger scale, a separator weigher shown in FIG. 1.

In the constructional form shown in FIG. 2 the ventilation valve 20 is formed directly by the bottom aperture 15 and the flap 16 which closes the said aperture and which can be opened and closed by means of an adjusting drive 21. The separator 13 comprises an upper part 22 with a conical wall. The lower part 23 is attached by means of a cylindrical central portion 24 to the upper part and the dimensions are made such that the upper part projects with its lower edge into the middle portion in such a manner as to form a flow detaching edge 25.

After the components have been separated and weighed respectively with the flap 16 closed, the said flap is opened while the suction fan 17 is running. The air which suddenly enters from below conveys a column of material of small diameter, which widens conically in an upward direction, upwards in the direction of the axis 19. This material is separated at the filter 14 and falls back on to the surface of the material remaining at the bottom of the container. At the same time, material in neighbouring regions slips downwards at various speeds until it is taken up by the inflowing air and also conveyed upwards. After the end of the mixing period the suction fan 17 is stopped or its pressure side is connected to the separator, so that with the flap 16 still open the mixed product is emptied from the separator.

Figure 3:
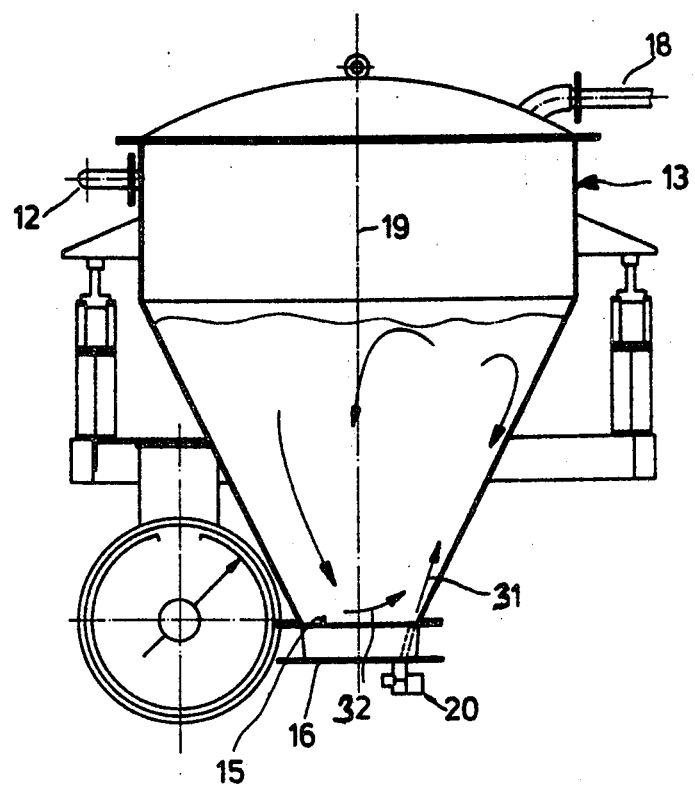
FIG. 3 is a detail view which shows a different constructional form of the separator weigher.

FIG. 3 shows another constructional form wherein the arrangement of the ventilation valve 20 is made such that when the valve 20 is opened the air enters the separator 13 eccentrically or obliquely relatively to the axis 19 of the separator 13, as indicated by the direction arrow 21. The ventilation valve can also be opened and closed intermittently with the fan 17 running, for example by means of a timing switch or by means of a pressure monitoring device which is arranged, for example, in the conduit 18 and gives a control pulse each time the desired negative pressure is reached. The control sequence is conveniently so chosen that the entire separator is not ventilated to normal pressure.

The inflowing air lifts the material in the manner shown by the direction arrow 31 and thereby rearranges the component layers or beds in this region relatively to one another. At the same time the bulk material in this region is fluidised, that is to say thinned out to a lower density. The material situated near at hand flows down into the space left free by this operation near the discharge aperture 15 in the direction shown by the arrow 32. Correspondingly there is a circulating movement as is shown by the other arrows indicated in FIG. 3. This circulating movement is carried out in a pulsatory fashion because of the intermittent operation of the ventilation valve 20.

In FIG. 3 the ventilation valve is only shown in a diagrammatic manner since a large number of constructional forms which have the same effect are available. The desired oblique inward flow of the air can be achieved by suitable arrangement of the ventilation valve, by suitable guiding of the entering air or by suitable arrangement of the opening movement of the valve member. It is also possible to provide two or more ventilation valves which are operated simultaneously or one after the other. It is also possible to use multi-action rotary slide valves or the like.

What is claimed is:

1. A suction conveying and mixing installation have a plurality of supply containers for different bulk material components, at least one suction conduit connected to the supply containers, a separator means including a mixing container for receiving said bulk material components which are separated from a conveying stream, said mixing container being connected to said suction conduit and having a bottom aperture for emptying the bulk material, a suction fan downstream of the separator means and in communication therewith, and means creating a mixing air flow in said mixing container for mixing the plurality of bulk material components which are separated out from the conveying stream, said means creating a mixing flow comprising at least one ventiltion valve in the region of the bottom aperture and means opening said ventilation valve after the end of a mixing container loading operation while the suction fan is running.

2. A suction conveying and mixing installation according to claim 1, wherein the bottom aperture itself serves as the ventilation valve, and includes a closure member which closes the bottom aperture during the loading operation and at the same time forms the valve member for the ventilation valve.

3. A suction conveying and mixing installation according to claim 2, wherein the closure member comprises a pivoting flap with an adjusting drive.

4. A suction conveying and mixing installation according to claim 1, wherein said mixing container has a wall which narrows in a conical manner towards the bottom aperture, the mixing container being non-continuously conical in shape.

5. A suction conveying and mixing installation according to claim 4, wherein the mixing container comprises a conically narrowing upper part, a lower part having a conical wall provided with the bottom aperture, and a flow detaching edge projecting into the separator situated between the upper and lower part.

6. A suction conveying installation according to claim 5, wherein the flow detaching edge is formed by the lower edge of said upper part projecting into said lower part.

7. A suction conveying installation according to claim 5, wherein said lower part comprises a cylindrical central portion engaging from the outside about the lower edge of said upper part.

8. A suction conveying installation according to claim 1, wherein the ventilation valve is arranged eccentrically relatively to the longitudinal axis of the mixing container or is provided with an appropriately arranged outflow duct.

9. A suction conveying installation according to claim 2, wherein the ventilation valve is provided in the closure member of the bottom aperture.

10. A suction conveying installation according to claim 1, including means for opening the ventilation valve intermittently.

11. A suction conveying installation according to claim 8, wherein the ventilation valve comprises a plurality of valve apertures which are arranged eccentrically relatively to the longitudinal axis of the mixing container, and means are provided for opening the valves one after the other with a time interval.

12. A suction conveying installation according to claim 1, wherein a plurality of ventilation valves are situated in the wall of the mixing container near the discharge aperture.

13. A suction conveying installation according to claim 10, including for controlling the ventilation valve or valves, a pressure monitoring device in part of the installation downstream of the separator.

14. A suction conveying and mixing installation according to claim 1, wherein said mixing container includes means for weighing the contents thereof.

* * * * *